Patented Sept. 3, 1935

2,013,329

UNITED STATES PATENT OFFICE 2,013,329

METHOD OF STAINING FIBROUS BODIES

Lois W. Woodford, New York, N. Y., assignor to R. W. Callaway, New York, N. Y., and Alan M. Mann, Scarsdale, N. Y., as joint trustees No Drawing. Application February 20, 1933, Serial No. 657,672

3 Claims. (Cl. 91—68)

In the co-pending application filed by William K. Divers, as administrator of the estate of Frank Tuchfarber, Dec. 13, 1932, now Patent 1,972,502 is set forth a certain Method of finishing wood, in which the wood or other fibrous, board-like body is first coated with a suspension in water of a colloidally divided resin which is insoluble in water, but is soluble in organic solvents. This suspension is ordinarily produced by the aid of organic dispersing agents, and the best results are obtained when a water-soluble gum is included. Later, a coating of film-forming finishing material is applied comprising a solvent for the resin used.

I have discovered that this process can be utilized as a basis for applying stains to wood or other fibrous board in a manner to obtain very extraordinary results.

In carrying out the process, a water-soluble stain such as a water-soluble aniline dye is selected and this is thoroughly dissolved in water and then a suspension is formed embodying the colloidally subdivided resin such as has been described, which is kept in suspension with an organic dispersing agent. It is frequently advantageous first to combine the color and the dispersing agent and then combine this with the resin. When this material is applied to an ordinary board, the dye is distributed very evenly, and it will be found that the grain of the wood is raised to a far lesser extent than in the case of the ordinary water stain. Further, it will be found that the very extraordinary result is obtained of having the dye stay exactly where applied with substantially no tendency to bleed along the grain of the wood. This means that the dye can be applied not only as a means for covering the entire surface but also in the form of a pattern which may have sharp edge lines, so that very beautiful results can be obtained, and by applying dyes simulating the color of other woods an effect of inlay can be had.

When the dye and suspended resinous material is first applied to the wood and dried, the surface will have a rather muddy appearance but later when a film-forming material such as ordinary varnish or lacquer is put on, the resin will dissolve in the varnish and the film will all clear up. It will further be found that the dye seems to attach itself in some selective manner to the fibers of the wood in such a way that the grain effects of the wood are remarkably preserved even with heavy applications of dark colors. This treatment gives a very clear surface and also seems to have some smoothing effect which decreases the need of the usual inert filler.

I have found it advisable in some cases to apply to the board to be treated a first coat consisting of a resinous suspension in water containing little or no dye or containing the dye for a base color, after which a second coat is applied containing the dyes to be found in the final finish. This two-coat application is particularly advantageous where a pattern is to be brought out on the surface of the wood.

As brought out in the said Divers application, various types of resinous material may be used, a preference being had for the gum resins such as gamboge or myrrh, but other resins, including synthetic resins, may likewise be employed. In the case of the gum resins, the gum ingredient will in whole or in part serve as a dispersing agent, but other dispersing agents may be employed such as gluten, casein, various vegetable proteins or soaps. If gamboge is used, it will of course give a somewhat yellowish tinge and this must be taken into account in planning the color scheme. Myrrh, on the other hand, has very little color.

My invention can readily be understood from the following illustrative example:

A solution was made by dissolving a teaspoonful of gluten flour in about 2 gallons of lukewarm water which was slowly boiled until the volume was reduced to 1 gallon. Another preparation was made by mixing 1½ ounces of powdered gamboge with 6 ounces of water. After the mixture had been allowed to stand for 24 hours, with frequent agitation, it was filtered through a coarse filter, giving a yellow suspension. 1¼ parts by volume of the gamboge suspension was mixed with 1 part of the gluten water and to this there was gradually added a strong solution of a dye made by mixing Ponceau red and Bismarck brown until a brown color was obtained. It was found that the dye dispersed evenly through the mixture when stirred. A similar mix was made up identical with the first except that no dye was added. As a modification, the dye may be included in whole or in part with the gluten water before this is mixed with the resinous suspension, or various other ways of making the mixture may be employed.

A maple board was treated with the mix containing no dye which was applied evenly and rapidly over the surface and allowed to dry. A design such as might be made by the inlay of one wood on another was then laid out on the board and the mixture containing the dye was applied to formulate the design. After this was dry, the surface was given three coats of a good grade of spar varnish. The resulting product gave a close approximation to an inlay and it was noticed that the lines between the colors were sharp without any tendency of one to run into the other. At the same time, the grain was clearly noticeable in both colors.

In like manner, designs using a large number of colors may be applied either on the wood in the white or on wood which has been given a preliminary coat, and such designs may be applied either with a brush or with a stencil, in which case spraying may be employed. In all cases results of great beauty are obtained at a very low expense due not only to the low cost of the materials but also to the great rapidity with which the preliminary coats dry. It is of course understood that the example given is by way of illustration only and that many changes and modifications may be made without departing from the spirit of my invention. In addition to its value as a finish for wood, my invention may also be applied advantageously to fibrous press-boards such as those now on the market made from bagasse or other similar materials.

What I claim is:

1. The method of finishing fibrous bodies which comprises applying to the surface of such a body a coating comprising a watery suspension in a solution of a water-soluble dye of a resin soluble in an organic solvent, permitting such coating to dry and thereafter applying a coating of a transparent film forming material comprising a solvent for such resin.

2. The method of finishing fibrous bodies which comprises applying to the surface of such a body a watery suspension of a water-insoluble resin comprising a soluble gum as a dispersing agent, permitting such coating to dry and then applying to a limited part of such surface a second coating consisting of a similar suspension in which is dissolved an aniline dye, and after permitting such second coating to dry, applying a coating of a transparent film-forming material comprising a solvent for such resin.

3. The method of staining fibrous bodies which comprises applying to such a body a liquid comprising a dye in solution and a colloidal suspension of a resin insoluble in such solution, permitting the solvent for the dye to dry and thereafter applying a solvent for the resin.

LOIS W. WOODFORD.